E. F. BARNES.
ATMOSPHERIC ELECTRICAL DISCHARGER.
No. 25,939. Patented Nov. 1, 1859.
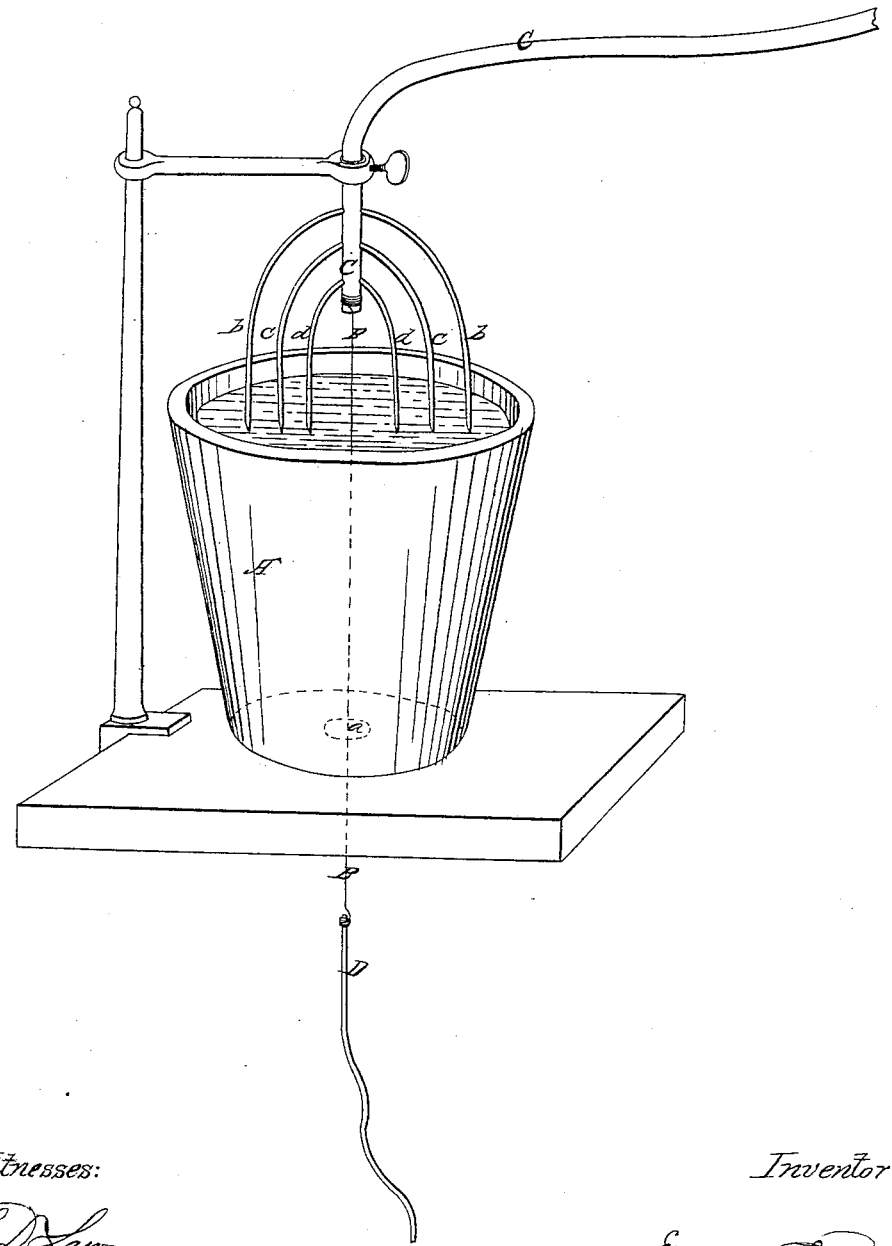
Witnesses:
Inventor:

UNITED STATES PATENT OFFICE.

E. F. BARNES, OF BROOKLYN, NEW YORK.

IMPROVED METHOD OF PROTECTING TELEGRAPHIC INSTRUMENTS AGAINST ATMOSPHERIC ELECTRICITY.

Specification forming part of Letters Patent No. 25,939, dated November 1, 1859.

*To all whom it may concern:*

Be it known that I, EDMUND F. BARNES, of the city of Brooklyn, county of Kings, and State of New York, have invented and applied to use certain new and useful improvements in apparatus to be used in connection with telegraphic machinery or instruments for the purpose of preventing the effect of undue quantities of atmospheric electricity, and which I call an "Atmospheric-Electricity Discharger;" and I do hereby declare that the following is a full, clear, and exact description thereof, reference being had to the accompanying drawings, and to the letters of reference marked thereon, and making a part of this specification.

The nature of my invention consists in interposing between the main wire of a telegraph-line and the telegraphic instrument an arrangement or combination of parts which shall disperse any undue quantity of atmospheric electricity before it reaches the telegraphic instrument, and thus prevent its usual effects in interfering with the free action of the instrument. Such arrangement or combination and its action is as follows:

A is a vessel, of glass, earthenware, or any material which is a non-conductor of electricity, and having through its bottom a small hole, *a*. Through such hole passes a small platinum wire, B, and it is then closed by any substance which will render it close, so that the vessel will hold liquid. One end of such platinum wire is attached to the wire C of the main line, and the other end is attached to a wire, D, which leads to one of the poles of the "mutator," so called, (when such instrument is used,) or to the resident magnet in a telegraphic instrument.

From the end of the main wire C project points or short wires *b c d*, which extend into the vessel A and below the surface of the fluid contained in it. This fluid is of such a character (as a solution of one part of sulphuric acid and twelve parts of water) that while it is a conductor of electricity its conductibility is less than that of the platinum wire which passes through it connecting the main wire and the mutator or instrument. Such platinum wire is also of such a size that it will allow the proper and easy passage of all necessary electricity to operate the instrument.

So long as the main wire is charged with only the voltaic current or the electricity produced by the battery, the whole passes through the platinum wire to the instrument, because the conductibility of such wire is greater than that of the fluid in the vessel into which the points *b c d* enter, and none of the electricity will therefore pass from off such points. Whenever the main wire becomes additionally charged by a superabundance of atmospheric electricity the intensity of which is higher, the platinum wire will, in fact, continue to conduct only the voltaic current, or but little in addition thereto, and such atmospheric electricity will pass from the main wire by means of the points *b c d* in the fluid in A, that being the next best conductor, near the platinum wire, and will be dissipated again into the atmosphere. The effect of the whole arrangement is therefore to dissipate the atmospheric electricity before it reaches the telegraphic instrument, the operation of which is not thus interfered with, but it works as well, or nearly as well, when atmospheric electricity is excited as when inert.

The benefit and advantage of my invention is therefore to provide and have in constant readiness upon and in connection with any telegraphic line and the instruments used thereon a certain means of dissipating any atmospheric electricity, which else would seriously interfere with their use and action; but on the other hand such arrangement does not in any respect interfere with the proper action of such instruments under ordinary circumstances, and have any telegraphic line furnished with this invention can be worked during times when the equilibrium of the atmospheric electricity is disturbed as when not.

The vessel A may be filled with any slightly-acidulated fluid instead of the fluid mixed exactly as above described, or may be filled with pure water, though in such case such vessel will require to be considerably larger.

Silver or copper wire or a wire of any good conductibility may be used in place of the platinum wire; but the latter is much preferable, as it is a sufficient conductor and does not fuse at any ordinary temperature.

By so discharging the atmospheric electricity all danger is prevented of its melting the wire in the coils of the magnet when its volume is large, or, when smaller, of destroying the adjustability of any magnet as at present used.

What I claim as my invention, and desire to secure by Letters Patent, is—

1. The application and use, in a telegraphic line or in connection with telegraphic instruments, of a vessel, A, containing acidulated water or fluid, as described, and having a platinum or other metallic wire, B, of better conductibility than the contents of such vessel, passing through such vessel and connecting by one end with the main wire and by the other with the telegraphic machine, the whole arranged substantially as and for the purposes set forth.

2. In combination or connection with such vessel of fluid A and wire B, the arrangement of the metallic points $b\ c\ d$ on the wire of the main line and extending into the fluid in A, substantially as and for the purpose set forth.

EDMUND F. BARNES.

Witnesses:
S. D. LAW,
ALFRED McINTIRE.